2,975,158
HIGH FLUIDITY PROCESS FOR POLYMERIZING VINYLIDENE CYANIDE

Kenneth L. Sayre, Lorain, Ohio, assignor to The B. F. Goodrich Company, New York, N.Y., a corporation of New York No Drawing. Filed Dec. 20, 1956, Ser. No. 629,445

6 Claims. (Cl. 260—78.5)

The present invention relates generally to the polymerization of vinylidene cyanide. More particularly, the present invention relates to an improved process for polymerizing vinylidene cyanide in an anhydrous, preferably all-organic, medium in which the vinylidene cyanide polymer is insoluble.

Vinylidene cyanide (1,1-dicyano ethylene) is a monomer which spontaneously homopolymerizes in the presence of a trace of moisture. To control the polymerization and to induce the vinylidene cyanide to copolymerize with another monomer (rather than its natural tendency to homopolymerize) the polymerization must be carried out in an anhydrous medium. In such a medium the homopolymer and/or copolymer formed is highly insoluble and the polymer is obtained in the form of extremely small, extremely insoluble particles which, apparently, have little tendency to agglomerate or aggregate. The total surface area of the polymer in such a reaction medium appears to be so large that an appreciable proportion of the liquid diluent content is taken up by the particle surface. As a result, the medium becomes too viscous for good heat transfer and reaction control. In fact, when the concentration is in the range of only about 8 to 12 percent, the reaction medium at the end of a reaction frequently resembles damp sawdust in which no free liquid can be observed. Moreover, even at lower solids levels the viscosity behavior of the medium is unpredictable and considerable variation is experienced in repeat experiments.

The principal object of this invention, therefore, is to provide a process for polymerizing vinylidene cyanide, which process includes a novel form of control over slurry viscosity. It is also an object to provide such a process which will result in particles of larger apparent size and thereby make possible operation on a higher total solids basis. Another object is to provide such a process capable of producing, in a controllable fashion, fluid slurries of at least 15 percent solids content. Other objects and advantages will be apparent, or will become apparent, in the following detailed description of the invention.

In accordance with the present invention it has been found that vinylidene cyanide (1,1-dicyano ethylene) can be polymerized under efficient agitation in a substantially anhydrous, acidic or neutral medium (i.e., up to and including pH 7) having an electrical conductivity above about $5 \times 10^{-7}$ mho. Under these conditions slurries of polymer are obtained which are of considerably increased fluidity for a given solids content over those produced in media of poorer conductivity. Moreover, fluid slurries are obtained at 25 to 30 percent by weight, or more, solids content as compared to a top limit of 8 to 12 percent in more poorly conducting media. Some evidence exists that as the vinylidene cyanide polymer is formed and precipitated out of solution as an extremely fine particle, the particles acquire a static electrical charge, often of considerable magnitude. It is believed that the static charges cause the particles to repel each other so strongly that coalescence or agglomeration of the particles is greatly reduced. As a result the apparent total surface area of the particles is sufficiently large as to take up such a large proportion of the liquid medium that fluidity is reduced or destroyed completely. In many cases, even at solids levels as low as 10 to 12 percent, practically all of the liquid is taken up and the product will resemble a moist sawdust.

As noted above two conditions are critical in achieving greater fluidity. One such condition is the electrical conductivity of the medium which must be at least $5 \times 10^{-7}$. The other condition is agitation. The reaction medium must be efficiently intermingled in order to achieve fluidity. Another condition, although not of critical importance perhaps, is the provision of an electrical pathway so that the charges can be conducted out of the reaction medium (or neutralized). With respect to the latter, it has been noted that the best results have been obtained in all-metal vessels well-grounded through their metal supply piping. Of these conditions, the electrical conductivity appears most critical, so critical in fact that it is possible to monitor the electrical conductivity of the medium throughout the reaction period and predict the viscosity of the medium. This predictability has been made use of in larger scale operations to obtain direct, and if desired, continuous and automatic, control over slurry viscosity.

Most anhydrous, non-metallic liquid media, and especially anhydrous organic substances, are very good dielectrics and have extremely low conductivities below about $1 \times 10^{-8}$ mho. Even a normally polar organic substance such as glacial acetic acid has an electrical conductivity below the latter figure. Consequently, in accordance with this invention, the conductivity of anhydrous, liquid polymerization media is increased by adding an electrolyte or strongly ionizable acidic substance thereto. Water or water plus an electrolyte will effectively increase conductivity, but as pointed out above, water can not be tolerated in a vinylidene cyanide polymerization system. It has been found that powerful anhydrous organic and inorganic acids or acid-producing substances such as perchloric acid, hydrobromic acid, chlorosulfonic acid, sulfuric acid, hydrochloric acid, and chloroacetic acids and sulfuryl halides have the power to very materially increase the electrical conductivity of anhydrous dielectric liquids. The strong halogen-containing acids and particularly chlorine-containing acids and acid chlorides, are preferred because of their apparently much greater ability to ionize, especially in anhydrous, polar organic liquids.

Hydrocarbons in the substantially pure and anhydrous condition have exceptionally high electrical resistivity (i.e. low conductance) and have relatively little power to ionize the above-named acidic substances so that somewhat larger amounts of the latter are required. However, there are certain polar neutral and acidic organic substances which are much superior to the hydrocarbons in this respect. Acetic acid is a substance of this class and this compound is among the most powerful known non-aqueous ionizing mediums. Consequently, in the method of this invention it is preferred to utilize as at least a portion of the liquid diluent medium a polar organic substance such as acetic acid containing sufficient of one or more of the above strongly ionizable acidic substances, preferably perchloric acid, hydrobromic acid, chlorosulfuric acid, or hydrochloric acid, to increase the electrical conductivity of the medium at least to $5 \times 10^{-7}$ mho.

An electrical conductivity of at least $1 \times 10^{-6}$ mho is much better and even higher values can be utilized to advantage if the system will tolerate the increased acidity.

However, the slurry will remain quite fluid (even at 20 to 25 percent solids or more) throughout the reaction if the $1 \times 10^{-6}$ value is maintained. The amount of acidic substance required depends on the acid strength of the material and the ionizing ability of the solvent or diluent. For example, perchloric acid is by far the strongest of the above-named substances, and as a result, in polar organic media such as acetic acid, as little as about 0.0001 to 0.1 percent by weight (as $HClO_4 \cdot 2H_2O$) based on the total weight of reaction medium is sufficient in many cases. Somewhat more of the less strongly acidic substances will have to be utilized. Since the amount will vary considerably depending on the diluent or solvent and also on the acidic ionizing agent utilized, it is preferred to continuously monitor the conductance of the medium with a conductivity or conductance cell and make whatever additions of acidic ionizing substance are indicated as necessary. The less soluble, less strongly acidic ionizing materials, for example anhydrous hydrochloric acid gas, will have to be utilized in appreciable quantities.

As indicated above, much better results are obtained when an electrical pathway is provided for escape (or neutralization) of the static electrical charges present on the particles. It has been found that slurry viscosities are lower and more predictable when an all-metal reaction vessel is employed, which vessel is well grounded through its supply piping, etc. Vessels of glass, glass-lined metal, ceramic, etc. seem to favor higher flurry viscosities and it seems necessary, in some cases, to increase the proportion of the strongly acidic ionizing electrolyte substance. While it may be theoretically possible to insert electrodes in the latter vessels, it would seem to be impossible to achieve a favorable volume/electrode surface area relationship, especially in larger vessels. Consequently, it is preferred, to employ metal vessels which are well grounded.

The electrical charges on the polymer particles have little mobility, even in the medium of greatly increased conductivity. For example, if a sample of the reaction medium of this invention is placed between metal plates and a high E.M.F. applied across the plates a considerable length of time will elapse before a noticeable layer of polymer will appear at one of the electrodes. As a result it is necessary to efficiently circulate the reaction medium to secure effective neutralization of the charges on the particles. Efficient agitation also seems to be required to circulate the medium over the metal reactor walls in order to secure effective transfer of electrical charges to ground. In many cases this means modifying the stirring apparatus or increasing the stirrer speed. A turbine-type blade located near the bottom of the vessel has been found most efficient in larger, commercial-size reactors. Large marine type agitators rotating in shaped housings also are effective. In some cases, baffles are effective.

The exact mechanism responsible for the results of the present invention is not known and it may be that more than one mechanism is involved. For example, when the reaction vessel is of metal and it is well grounded, the equivalent electrical circuit can be considered to comprise a connection from the source of charge (polymer particles) through a resistance (imperfectly conductive reaction medium) to ground (grounded vessel). On the other hand it is known that in a dielectric medium, or in an imperfectly conductive medium, electrical charges can be neutralized by what is known as the "double layer effect" wherein a colloidal charged particle is neutralized by ions of opposite polarity. Either or both of these mechanisms may be functioning in the method of this invention.

The method of this invention is most effective in the polymerization of vinylidene cyanide alone or in conjunction with other monomers. Vinylidene cyanide (1,1-dicyanoethylene) is a monomeric substance having the following properties: M.P. 9.0–9.7° C.; B.P. 40° C./5 mm. Hg; $d\ 23/4 = 0.992$; and $N\ 20/d = 1.4411$. Such a material is made by processes described in U.S. Patent Nos. 2,476,270; 2,502,412; and 2,514,387.

Vinylidene cyanide homopolymerizes to form a homopolymer of substantial molecular weight which is hard, rigid and of sparing solubility in water and most common solvents. Vinylidene cyanide tends to homopolymerize, as noted above, even in the presence of other actively polymerizable comonomers, and it will do so spontaneously in the presence of traces of moisture. It is for this reason that this monomer must be polymerized under substantially anhydrous conditions. Further, vinylidene cyanide evidences a strong tendency to form essentially 1:1 alternating copolymers. Unless such a copolymer is formed the conversion of total monomer to polymer will be low and/or the desired product will be contaminated by the insoluble homopolymer. It has been found that the presence of an excess of the comonomer usually suppresses the formation of the homopolymer and favors the formation of the 1:1 copolymer. For example, in U.S. Patent No. 2,615,866, vinylidene cyanide (1 to 90 mol percent) and vinyl acetate (10 to 99 mol percent) react to form an essentially 1:1 alternating copolymer of great value as a fiber-forming resin. In the latter system the use of about 7 mols of vinyl acetate for every mol of vinylidene cyanide results in practically complete conversion of vinylidene cyanide to the 1:1 copolymer. Other known monomers copolymerize with vinylidene cyanide in a similar fashion.

Such other monomers include monoolefinic monomers including specifically vinyl chloride; allyl chloride; vinylidene chloride; vinyl esters such as vinyl acetate, vinyl propionate, and others; acrylate esters such as methyl acrylate, ethyl acrylate, octyl acrylate, methyl methacrylate, and others; acrylonitrile; methacrylonitrile; acrylamide; styrene; ethylene; propylene; isobutylene; dichlorodifluoro ethylene; vinyl alkyl ethers such as methyl vinyl ether; vinyl alkyl ketone such as methyl vinyl ketone; alpha-beta unsaturated acids and their anhydrides such as acrylic acid, methacrylic acid, crotonic acid, itaconic acid, maleic anhydride; and many others. Diolefinic monomers, especially the butadiene-1,3 hydrocarbons such as butadiene-1,3, isoprene, piperylene, and the like also copolymerize with vinylidene cyanide forming 1:1 alternating copolymers of great utility. Still other monomers may be utilized and combinations of any two or more of the above and other monomers can be utilized. Vinyl acetate is a preferred monomer.

In the practice of this invention, vinylidene cyanide is copolymerized in an anhydrous diluent which is a solvent for the monomeric vinylidene cyanide and/or the other comonomeric materials but which is a non-solvent for the polymer or copolymer. Such diluent media may be any hydrocarbon including aliphatic, aromatic or cycloaliphatic hydrocarbons; chlorinated hydrocarbons, particularly chlorobenzene; organic acids, particularly acetic acid and any other liquid, anhydrous organic acid; ketones, ethers; excess monomers and any other liquid, anhydrous organic vehicle which will not react with the monomers or actively inhibit the polymerization mechanism. Much preferred, however, are polar organic substances such as halogenated aromatic hydrocarbons, carboxylic acids, certain ethers such as dioxane, and others. These substances respond more readily to the acidic electrolytes and it is possible to achieve higher conductivities with less electrolyte. Acetic acid is perhaps the best ionizing organic medium which is inert to the monomer and is not a solvent for the polymer.

Usually, to secure a desirable reaction rate with most comonomers it is preferred to employ a polymerization catalyst such as any of the solvent or diluent-soluble peroxy compounds including peroxides, hydroperoxides, diazoamino benzene, and many others. The polymerization reaction temperature can be varied, for example from about 0 to about 70° C., most preferably at a temperature of 35 to 55° C. Of course, to preserve substantially anhydrous conditions the solvents and monomers should be dry and the reaction carried out in a closed container or vessel under an inert atmosphere or under a vacuum.

The invention will now be more fully described with reference to several specific examples which are intended to be illustrative only.

*Examples 1 to 4*

In these and subsequent examples the source of the vinylidene cyanide is a crude pyrolysis product obtained from the pyrolysis of diacetyl cyanide (1-acetoxy-1,1-dicyano ethane) according to a process similar to that of U.S. Patent 2,476,270. The crude product, which contains about 38 percent by weight of vinylidene cyanide (1,1-dicyano ethylene), about 10 percent of monochlorobenzene (added to the 1-acetoxy-1,1-dicyano ethane as a pyrolysis stabilizer), about 40 percent of acetic acid, up to 5 or 10 percent of unreacted 1-acetoxy-1,1-dicyano ethane, a trace of HCN and other unidentified products, is utilized as such because of difficulties in stabilizing essentially pure vinylidene cyanide during distillation, extraction, etc.

In Example 1 a glass-lined metal reactor of about 15 gallons capacity having a pot diameter of about 18 inches is utilized. The agitator is a stainless steel shaft carrying a 6 inch marine type propeller which is operated at 320 r.p.m. The glass lining on the vessel is continuous on all interior surfaces. A charge containing 7 mols of vinyl acetate, 1 mol of vinylidene cyanide (added as the crude pyrolysis product described above), and about 0.05 percent by weight on the monomers of O,O'-dichlorobenzoyl peroxide is added to the dry, evacuated vessel and the reaction is conducted at 40 to 50° C. The conductivity of this medium throughout the reaction is so very low as to be off scale of the conductance cell utilized (i.e. lower than $4 \times 10^{-8}$ mho). At the end of the reaction it is impossible to drain or even blow the charge out of the reactor. When the reactor is opened it is found that there is a quantity of loose, solid material collected at the bottom of the reactor. The latter material resembles damp sawdust and there are no signs of liquid material. In fact, no liquid can be squeezed or filtered out of the product and the latter has to be laboriously dried in a solvent drier. The polymer, however, is normal and forms excellent fibers.

In Example 2 an all-stainless steel reactor of 50 gallon capacity (diameter—30 inches) having a single upstanding stainless steel baffle secured near the bottom. This reactor is fitted with a stainless steel agitator shaft on which is secured three anchor-shaped blades, equidistantly spaced radially on the shaft. Into this reactor there is charged a reaction mixture having the composition of that of Example 1. The result is the same.

In contrast, in Example 3 a large scale charge totaling about 2500 pounds is prepared in a large hold-up tank. This charge is made up by combining the materials in the order indicated below:

| Material: | Amount |
|---|---|
| Pyrolysis product (38% $CH_2=C(CN)_2$) lbs | 637 |
| Chlorosulfonic acid ml | 500 |
| Vinyl acetate lbs | 1863 |
| O,O'-dichlorobenzoyl peroxide lbs | 4.38 |

The above charge is passed in series through a 5-stage reactor made up of five 15 gallon pots (12 inch diameter) vertically stacked on a common agitator shaft. In each pot there is disposed a 7 inch marine type impeller. The agitator shaft is operated at 300 r.p.m. The reaction is conducted at 40 to 50° C. and is completed in a total time of 12 to 16 hours. The product obtained is a slurry of about 17 percent solids content, which slurry is sufficiently fluid to be blown out of the hold-up tank into a filter. During the reaction the operator periodically checks the reading of a conductance cell connected by piping with one of the pots. In this run these readings vary between $3 \times 10^{-7}$ and $5 \times 10^{-7}$ mho. Repeat charges of this same type seem to indicate that slurry viscosity is unpredictable below a value of about $5 \times 10^{-7}$ mho while at this value or higher the slurries always can be handled at 17 percent T.S. or below. It is found that conductivity values above $5 \times 10^{-7}$ mho (i.e. more chlorosulfonic acid) are required if it is desired to operate above about 17 percent T.S.

In Example 4, the small all-stainless reactor of Example 2 is utilized in a continuous style polymerization. The charge recipe is that of Example 3 except that a slightly higher proportion of chlorosulfonic acid is utilized to raise the conductivity to $1 \times 10^{-6}$ mho. This requires about 1 cc. of chlorosulfonic acid for every pound of copolymer in the final slurry. With this concentration of acid present the 7:1 mixture of vinylidene cyanide and vinyl acetate is continuously fed to the reactor while withdrawing a stream of reaction slurry to maintain a constant volume in the reactor. By this procedure it is possible to withdraw a very fluid slurry averaging 22 percent in total solids content which has a viscosity of the order of 20 to 100 centipoises. Examination of the slurry particles with the electron microscope indicates that the ultimate particles are not appreciably larger than those of the damp sawdust-like material of Example 1, although this finding does not negative the possibility that the particles may be agglomerated or loosely associated. The slurry viscosity would indicate a reduced apparent particle total surface area.

Repeat experiments with increasing amounts of chlorosulfonic acid (up to 400 cc./2500 lbs.) employing the equipment and continuous procedure of Example 4 result in slurries containing up to 27.5 percent or more total solids which are almost water-like in consistency. The conductivity of these reaction mediums varies between about $2 \times 10^{-5}$ and $1 \times 10^{-6}$ mho. In some of these experiments the conductivity is monitored with a conductivity cell and when the value falls below about $1 \times 10^{-6}$ additional chlorosulfonic acid is added.

*Example 5*

In this example, an equivalent amount of benzene sulfonic acid is substituted for the chlorosulfonic acid of the previous examples. At 17 percent solids content the final slurry resembles damp sawdust. This would seem to indicate that the chlorosulfonic acid may liberate HCl and that the latter is the effective agent in obtaining the increased slurry solids and fluidity. Anhydrous hydrochloric acid is then added to a similar charge containing no chlorosulfonic acid or benzene sulfonic acid. A noticeable improvement in slurry fluidity is obtained at the 17 percent solids level. When an excess of anhydrous HCl gas is bubbled through a charge similar to that of Example 1 employing the continuous procedure, a slurry having a viscosity in the region of 20 to 100 centipoises is obtained at a 17 to 22 percent total solids level. Chlorosulfonic acid, however, appears to be much more effective than HCl on an equal weight or equivalent molar basis.

*Example 6*

A reduction in slurry viscosity similar to that obtained with chlorosulfonic acid and hydrochloric acid is attempted through the use of acetic acid or benzene as a diluent. When acetic acid is utilized a volume thereof equal to the entire volume of the charge is required before the reaction slurry can be handled and pumped. With benzene a dilution of 90 percent is required. Even at a 10 percent solids level in benzene the final slurry is quite thick and can be poured or pumped only with considerable difficulty. That these solvents are mere diluents is confirmed by conductivity readings lower than $4 \times 10^{-8}$ mho.

*Example 7*

In this example, perchloric acid is added as a replacement for the chlorosulfonic and hydrochloric acids of the previous examples. The following materials are charged to a dry, evacuated metal reaction vessel equipped with a propeller-type stirrer:

| Material: | Quantity |
|---|---|
| Pyrolysis product (Example 1) | grams__ 62 |
| HClO₄·2H₂O (1% solution in acetic acid) | cc__ 10 |
| Vinyl acetate | grams__ 192 |
| Monochlorobenzene | do____ 261 |
| O,O'-dichlorobenzoyl peroxide | do____ 0.92 |

The reaction mixture is prepared by combining the pyrolysis product with the perchloric acid and then adding the remaining ingredients and agitating vigorously while the mixture is heated to 60° C. until cloudiness appears. Then the reaction temperature is maintained at 54 to 55° C. In less than 3 hours the reaction is complete with the production of a very thin slurry containing over 10 percent total solids. The net yield of copolymer is 51.7 grams which compares very favorably with a theoretical yield of 52.5 grams, thus indicating essentially complete conversion of the vinylidene cyanide and the formation of the essentially pure 1:1 alternating copolymer. The conductivity of the medium is quite high, being of the order of $2 \times 10^{-5}$ mho, or higher, throughout the reaction.

Films are cast from the resins made with chlorosulfonic, hydrochloric and perchloric acids. That made from the resin of Example 7 is considerably lighter in color than those of the resins made with chlorosulfonic and hydrochloric acids. Although a much stronger acid, there is much less of the perchloric acid and less troubles are experienced with spinning dopes and equipment corrosion. Very fine fibers spun from the resin of Example 7 appear to be of a definitely superior quality.

*Example 8*

This experiment, conducted with a view to evaluating any potential danger of explosion when perchloric acid is added to a mixture of highly reactive monomers, demonstrates that perchloric acid is, quite unexpectedly, a good stabilizer or polymerization inhibitor for vinylidene cyanide. A mixture is prepared by adding 10 ml. of 1 percent HClO₄·2H₂O in acetic acid to 10 ml. of the pyrolysis product of Example 1. No cloudiness is observed on standing. With 20 ml. of the 1 percent HClO₄ solution the solution stays clear for 88 hours or more whereas an unstabilized control shows a flocculent precipitate in less than 16 hours. With up to 100 ml. of the 1 percent HClO₄ solution it is possible to preserve the clarity of the crude pyrolysis product for 130 hours or more.

It was found that perchloric acid is without effect on vinyl acetate providing the perchloric acid solution is first blended with about an equal volume or more of the crude pyrolysis product. Further evidence that the perchloric acid does not react with the mixture of monomers or cause premature polymerization is obtained by preparing a mixture of 43.8 grams of the pyrolysis product, 7 ml. of the 1 percent HClO₄ solution, and 131 grams of vinyl acetate. The conductivity of this solution is $1.35 \times 10^{-6}$ and after 24 hours at room temperature this value has fallen only to $1.05 \times 10^{-6}$.

*Example 9*

In this experiment it is attempted to show whether grounding of the reaction vessel is required. The reaction vessel is a glass resin ketle of 2 liters capacity (5¾₆ inches diameter) fitted with 4 baffles (16%) secured in the sides. The agitator comprises a metal shaft carrying a 3¼ inch turbine impeller which is operated at 1900 r.p.m. The charge consists of 260 grams of the crude pyrolysis product (Example 1), 0.33 gram of chlorosulfonic acid (0.03% by weight on total charge), 739 grams of vinyl acetate and 1.75 grams of dichlorobenzoyl peroxide. The reaction is run at 60° C. for 2.5 hours. The final slurry contains about 20 percent total solids and it is quite viscous, although it will flow. This experiment seems to indicate that rapid agitation and high acid content can partially offset the lack of a grounded vessel.

While there have been disclosed certain preferred manners of performing the present invention, it is not intended or desired to limit the invention thereto, for the precise proportion of the materials utilized may be varied and equivalent chemical materials may be employed, if desired, without departing from the spirit and scope of the invention as defined in the appended claims.

I claim:

1. The method of preparing 1:1 alternating copolymers of 1,1-dicyanoethylene comprising mixing from 10 to 30% wt. of a monomeric material containing 1,1-dicyanoethylene and a molar excess of a comonomer, selected from the class consisting of monoolefinic monomers and diolefinic monomers copolymerizable with 1,1-dicyanoethylene, with an anhydrous, polar organic diluent medium containing as essential ingredients (1) a polar solvent selected from the class consisting of halogenated aromatic hydrocarbons, liquid carboxylic acids, and ethers, (2) an acidic electrolyte substance soluble in and ionizable in said diluent medium and selected from the class consisting of hydrochloric acid, hydrobromic acid, perchloric acid, chlorosulfonic acid, chloroacetic acids, sulfuryl halides and acid chlorides, said electrolyte being present in said medium throughout the polymerization in a proportion sufficient to impart thereto a conductivity above about $5 \times 10^{-7}$ mho, and (3) a polymerization catalyst, and polymerizing said monomeric material in said medium at a temperature of from about 0° C. to about 75° C. while vigorously agitating the mixed materials, thereby to obtain a slurry of said copolymer having greater fluidity than that of a corresponding slurry obtained at lower conductivities.

2. A method as defined in claim 1 wherein the said electrolyte substance is hydrochloric acid.

3. A method as defined in claim 1 wherein the said comonomer is vinyl acetate and the said diluent includes acetic acid and an excess of vinyl acetate.

4. A method as defined in claim 1 wherein the said polymerization medium is in contact with ground potential.

5. A method as defined in claim 1 wherein the said halogen-containing acid is chlorosulfonic acid.

6. A method as defined in claim 1 wherein the said halogen-containing acid is perchloric acid.

References Cited in the file of this patent

UNITED STATES PATENTS

| 2,615,866 | Gilbert et al. | Oct. 28, 1952 |
| 2,657,197 | Carlson | Oct. 27, 1953 |
| 2,837,500 | Andres et al. | June 3, 1958 |
| 2,837,501 | Millhiser | June 3, 1958 |

OTHER REFERENCES

Howland et al.: "Industrial and Engineering Chemistry," vol. 44, pp. 762–768 (1952).